United States Patent [19]
Aoki

[11] Patent Number: 4,830,476
[45] Date of Patent: May 16, 1989

[54] COMPACT ZOOM LENS SYSTEM
[75] Inventor: Norihiko Aoki, Tokyo, Japan
[73] Assignee: Olympus Optical Co., Ltd., Tokyo, Japan
[21] Appl. No.: 190,399
[22] Filed: May 5, 1988
[30] Foreign Application Priority Data
  May 8, 1987 [JP] Japan .................. 62-110629
[51] Int. Cl.$^4$ .................. G02B 15/14; G02B 9/58
[52] U.S. Cl. .................. 350/427; 350/413; 350/469
[58] Field of Search .......... 350/427, 469, 426, 413, 350/423

[56] References Cited
  FOREIGN PATENT DOCUMENTS
  61-159612 7/1986 Japan .
  0259216 11/1986 Japan .................. 350/413

Primary Examiner—Bruce Y. Arnold
Assistant Examiner—Rebecca D. Gass
Attorney, Agent, or Firm—Cushman, Darby & Cushman

[57] ABSTRACT

A compact zoom lens system with a zooming ratio of about 2 and a large aperture ratio comprises, in order from the object side, a front lens group having a positive refracting power and a rear lens group having a negative refracting power, which is arranged to be zoomed by varying the space between the both lens groups, and in which the front lens group comprises a negative lens component and a positive lens component and the rear lens group comprises a positive lens component and a negative lens component so that this lens system comprises four components as a whole.

8 Claims, 9 Drawing Sheets

FIG. 1
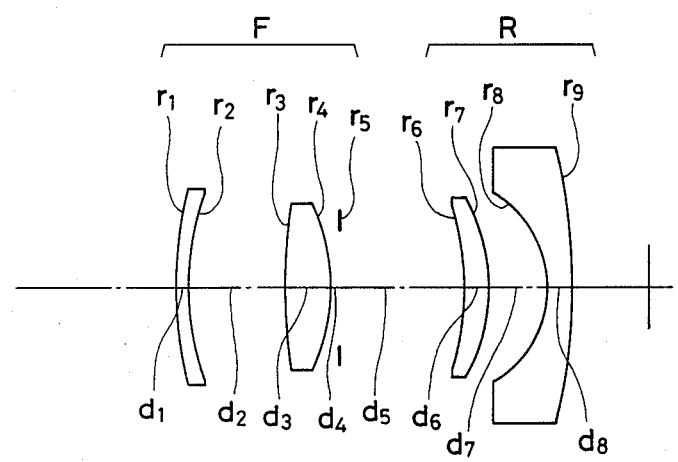
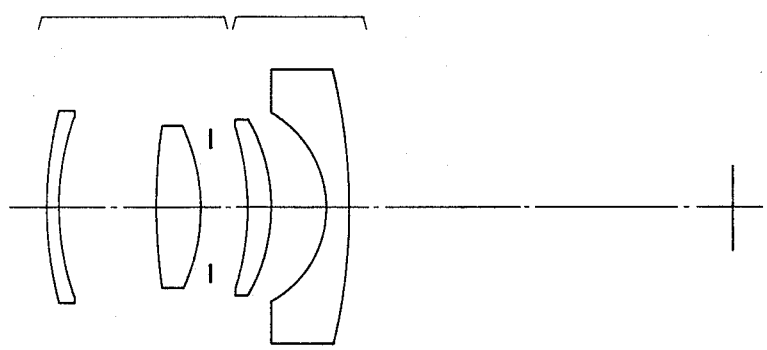

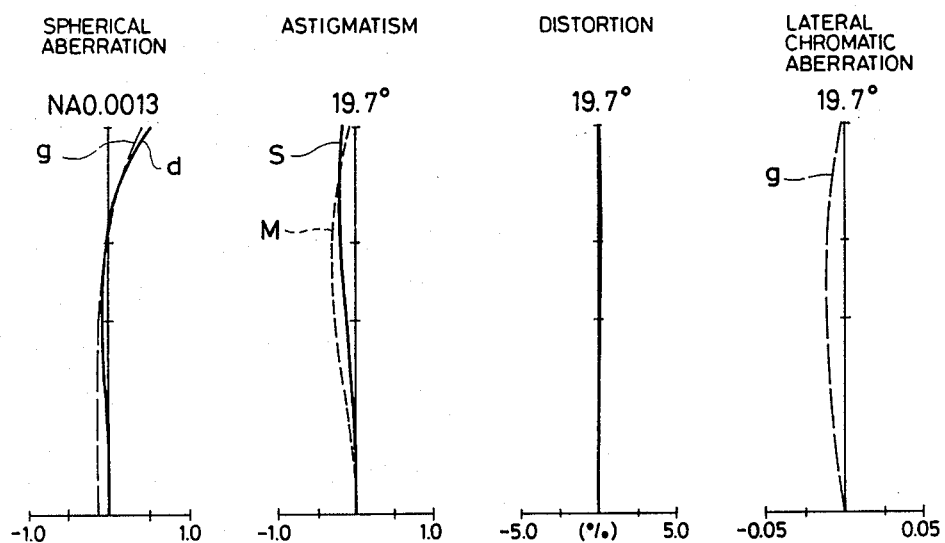
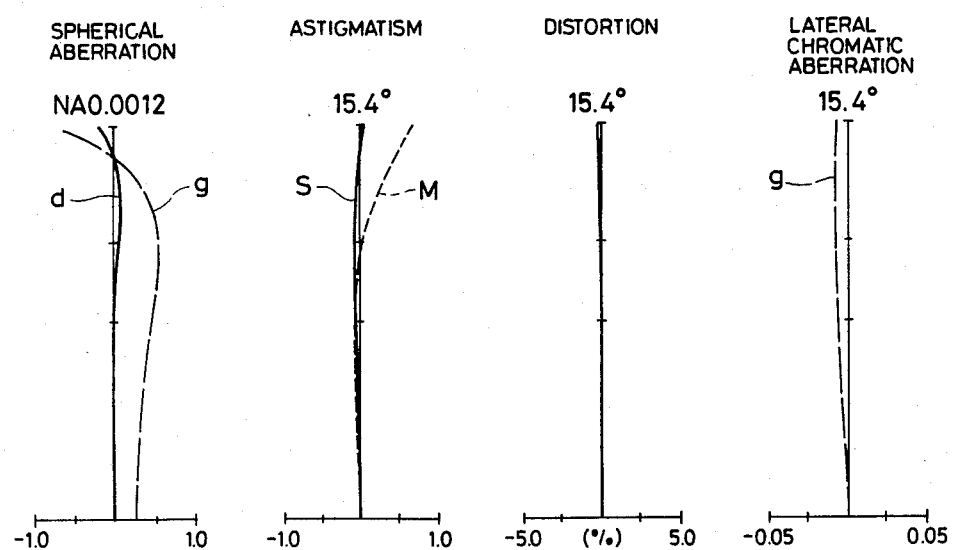

COMPACT ZOOM LENS SYSTEM

BACKGROUND OF THE INVENTION (a) Field of the Invention

This invention relates to a compact zoom lens system for use in a lens-shutter camera.

(b) Description of the prior art

Recently, together with the progress in compactness of cameras, there has also been an attempt to make a zoom lens system compact and light. Especially, in a lens-shutter camera in which objective lens systems cannot be exchanged, there has been required a camera having a compact zoom lens system with a zooming ratio of about 2.

As a zoom lens system which satisfies the above-mentioned requirements, there has been known a zoom lens system comprising a front lens group having a positive refracting power and a rear lens group having a negative refracting power and being arranged to be zoomed by varying the space between these lens groups, which lens system has been disclosed, for example, in Japanese Published Unexamined Patent Application No. 159612/86. In order to make the lens system having such lens configuration more compact, the radius of curvature of each lens-surface may be made smaller so that the power of each lens may become stronger. In this case, however, the fluctuation of aberrations during a zooming operation becomes large, which makes it impossible to correct aberrations favorably and to make the zooming ratio large. In order to decrease the fluctuation of aberrations during a zooming operation, to correct aberrations favorably and to obtain a sufficient zooming ratio, the number of lens components needs to be increased so that the lens system becomes large as a whole, which is contrary to the requirement of compactness. When the power of each lens is made weaker in order to decrease the fluctuation of aberrations during a zooming operation, the moving amount of each lens group will become larger so that it becomes impossible to make the lens system compact.

It has been known that, in order to overcome the above-mentioned problems, a zoom lens system employed a graded refractive index lens, as disclosed in Japanese Published Unexamined Patent Application Nos. 148414/86, 259216/86, 295524/86. In such a zoom lens system, however, the number of lens components thereof is no less than 5 so that these lens systems cannot be said to be compact and sufficiently light.

SUMMARY OF THE INVENTION

It is, therefore, the primary object of the present invention to provide a compact zoom lens system in which, despite that the number of lens components is 4, the fluctuation of aberrations during a zooming operation is small and a zooming ratio is about 2.

A zoom lens system according to the present invention comprises, in order from the object side, a front lens group having a positive refracting power and a rear lens group having a negative refracting power, which is arranged to be zoomed by varying the space between the front lens group and the rear lens group, and in which the front lens group comprises a negative lens component and a positive lens component, and a rear lens group comprises a positive lens component and a negative lens component.

In order that only four lens components constitute the zoom lens system comprising two lens groups of a front lens group having a positive refracting power and a rear lens group having a negative refracting power according to the present invention, it is desirable that the front lens group comprises two lens components and the rear lens group comprises two lens components in view of the correction of chromatic aberration.

However, in this type of zoom lens system comprising two lens groups, positive distortion is easily generated due to power distribution, which is especially remarkable in the wide-angle position. This is mainly caused by the rear lens group having a negative refracting power. In order to correct this positive distortion, it should be canceled with a negative distortion generated by the front lens group having a positive refracting power. In order to generate a relatively large negative distortion, the lens component disposed on the position where the height of off-axial ray through the lens is large, that is, the lens component nearest to the object, needs to have a negative refracting power, which makes it possible to correct distortion favorably. Because the object side lens component of the front lens group is made to be negative, it is necessary for the image side lens component thereof to have a positive refracting power.

Moreover, in order to decrease a telephoto ratio in the telephoto position, it is necessary for the secondary principal point of the whole lens system to be positioned as near to the object as possible. Because of this, it is desirable for the rear lens group to comprise, in order from the object side, a positive lens component and a negative lens component.

Based on the above-mentioned reason, a zoom lens system according to the present invention comprise two lens groups of a front lens group having a positive refracting power and a rear lens group having a negative refracting power and is characterized in that, in order to correct distortion favorably and to make the lens system compact, the front lens group comprises, as mentioned above, a first lens component of a negative lens and a second lens component of a positive lens and the rear lens group comprises a third lens component of a positive lens and a fourth lens component of a negative lens, and the space between the front lens group and the rear lens group decreases during a zooming operation from the wide-angle position to the telephoto position.

In the zoom lens system according to the present invention, as mentioned above, the first lens component comprises a negative lens for generating negative distortion. When the object side surface of this first lens component is concave, the deflecting angle of the off-axial ray at this surface will become large so that, especially, coma will deteriorate. Therefore, it is desirable for the first lens component to be a negative meniscus lens having its convex surface directed toward the object.

Even in the lens configuration mentioned as above, it may be impossible to correct aberrations sufficiently by means of four-lens configuration. In order to correct aberrations sufficiently, it can be considered to employ a graded refractive index lens.

In the zoom lens system according to the present invention, a so-called radial graded refractive index lens which has the refractive index distribution in the radial direction is employed to correct aberrations satisfactorily.

This radial graded refractive index lens has the refractive index distribution expressed by the following formula:

$$n(r) = n_0 + n_1 r^2 + n_2 r^4 + \ldots$$

where $n(r)$ represents the refractive index at the radial distance r from the center of the lens, $n_0$ represents the refractive index at the center of the lens, r represents the radial distance from the center of the lens, $n_1, n_2, \ldots$ respectively represent the 2nd-, 4th-, ... order coefficients.

It is necessary for an objective lens used in a camera to correct various aberrations with good balance. Once the power distribution of the lens system is determined, it will become difficult to correct Petzval's sum especially so that it will become important to correct it.

Petzval's sum of a system using a homogeneous medium is expressed by $\Sigma(\phi/n)$ where $\phi$ represents the refracting power of the lens surface and n represents the refractive index of the lens. But, in the case of a graded refractive index lens, Petzval's sum is expressed by the following formula:

$$\Sigma(\phi/n) + \Sigma(\phi_m/n_0^2)$$

where $\phi_m$ represents the refracting power of the lens medium and $n_0$ represents the refractive index at the center of the lens. That is, in a graded refractive index lens, the lens medium has the ability to correct Petzval's sum and to correct curvature of field sufficiently.

In a graded refractive index lens, because the lens medium has a refracting power, it is possible to weaken the curvature of the lens surface compared with a homogeneous lens when both lenses have the same refracting powers, which makes it possible to control the generation of aberrations to be small.

In the zoom lens system according to the present invention, the first lens component comprises a negative lens for generating negative distortion. Moreover, this first lens component is selected to be a graded refractive index lens to thereby generate negative distortion in the lens medium, which makes it possible to correct positive distortion generated in the rear lens group more sufficiently. At the same time, coma and astigmatism are also corrected favorably by the lens medium of the graded refractive index lens as the first lens component.

However, in the above-mentioned case, spherical aberration becomes over-corrected. Because of this, the second lens where the height of marginal ray through the lens is large is a graded refractive index lens selected to correct spherical aberration without the deterioration by other aberrations.

Because the space between the front lens group and the rear lens group is large in the wide-angle position, the height of the marginal ray through the rear lens group is small. But, because the space between the front lens group and the rear lens group is small in the telephoto position, the height of the marginal ray through the rear lens group is large. Therefore, spherical aberration generated in the rear lens group is large in the telephoto position. In order to correct this favorably, it is effective to employ a graded refractive index lens as the third lens component.

Moreover, in the zoom lens system according to the present invention, it is desirable to satisfy the following conditions (1) and (2) to thereby correct aberrations more effectively:

$$f_n/f_w < -1.5 \tag{1}$$

$$n_0(2) < 1.7 \tag{2}$$

where $f_n$ represents the focal length of the negative lens arranged nearest to the object (or the first lens component), $f_w$ represents the equivalent focal length of the whole system in the wide-angle position, $n_0(2)$ represents the refractive index at the center of the second lens component.

In the condition (1), when $f_n/f_w$ exceeds the upper limit thereof, positive distortion generated at the wide-angle position will be over-corrected to thereby generate negative distortion which cannot be corrected effectively. And, it will be also impossible to correct spherical aberration favorably.

In the condition (2), $n_0(2)$ exceeds the upper limit thereof, spherical aberration which is over-corrected by the first lens component, especially, in the telephoto position cannot be corrected sufficiently.

In the zoom lens system according to the present invention, the refracting power of the front lens group largely depends on the second lens component. Therefore, the curvature of the second lens component is made to be small so that the amounts of various aberrations generated in this lens are large.

In view of the above-mentioned point, it is desirable for the second lens component to satisfy the following condition (3):

$$-12.25 < (f_w)^2 \times n_1(2) < 0 \tag{3}$$

where $n_1(2)$ represents the coefficient $n_1$ on the expression of the refractive index distribution of the second lens component.

Below the upper limit of this condition (3), the medium of the second lens component will function as that having a positive refracting power so that it will be possible to weaken the curvature of the second lens component, which makes it possible to control the generation of various aberrations to be small. But, when the upper limit thereof is exceeded, the generation of various aberrations will become large. When the lower limit of the condition (3) is exceeded, the variation of the refractive index will become too large so that it will become difficult to manufacture the graded refractive index lens itself.

In the rear lens group of the zoom lens system according to the present invention, in order to decrease the telephoto ratio and to generate negative distortion, the third lens component is selected to be a positive lens. Therefore, the negative refracting power of the rear lens group depends on the fourth lens only so that the power of this lens becomes large. When the power of this fourth lens component becomes large, positive distortion will be generated, which means a vicious circle. Thus, it is desirable to have the negative refracting power shared also with the third lens component. Because of this, it is desirable for the third lens component to be a graded refractive index lens and to satisfy the following condition (4):

$$0 < (f_w)^2 \times n_1(3) < 12.25 \tag{4}$$

where $n_1(3)$ represents the coefficient $n_1$ on the expression of the refractive index distribution of the third lens component.

Above the lower limit of this condition (4), the medium of the third lens component will function as that having a negative refracting power to thereby share the negative refracting power with the lens component other than the fourth lens component in the rear lens group, which makes it possible to suppress positive distortion. When the lower limit thereof is exceeded, it will become impossible to suppress positive distortion. When the upper limit of the condition (4) is exceeded, the variation of the refractive index will become too large so that it will become difficult to manufacture the graded refractive index lens itself.

BRIEF DESCRIPTION OF THE DRAWINGS

FIG. 1 shows a schematic sectional view of the zoom lens system according to the present invention;

FIGS. 5 through 7 show graphs illustrating aberration curves of Embodiment 2 of the zoom lens system according to the present invention;

DETAILED DESCRIPTION OF THE PREFERRED EMBODIMENTS

Figure 2:
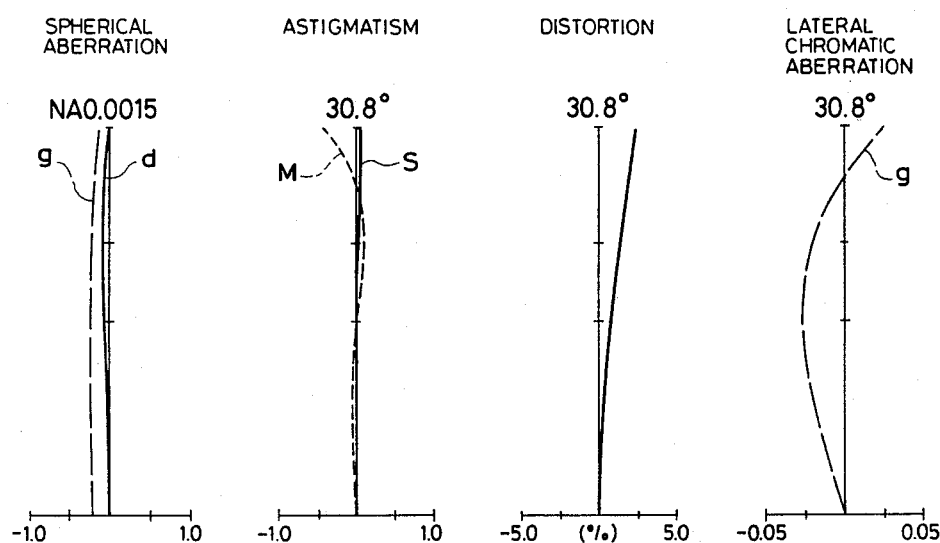
FIGS. 2 through 4 show graphs illustrating aberration curves of Embodiment 1 of the zoom lens system according to the present invention.

Embodiments 1 through 5 disclosed below of the zoom lens system according to the present invention have respectively the lens configuration as shown in FIG. 1 which comprises, in order from the object side, a front lens group F and a rear lens group R. The front lens group F comprises a first lens component of a negative meniscus lens having its convex surface directed toward the object and a second lens component of a biconvex lens. The rear lens group R comprises a third lens component of a positive meniscus lens having its concave surface directed toward the object and a fourth lens component of a negative meniscus lens having its concave surface directed toward the object. The zooming operation is conducted by the movements of both the front lens group and the rear lens group in which the space between the both lens groups is decreased from the wide-angle position W to the telephoto position T.

The numerical data of preferred Embodiments 1 through 5 of the zoom lens system according to the present invention are as follows:

EMBODIMENT 1

$f = 36.3-68.5 \quad F/4.5-F/5.6$ $r_1 = 52.7617$
$\quad d_1 = 1.1211 \quad n_{01} = $ graded refractive index lens
$r_2 = 31.8042$
$\quad d_2 = 10.7569$
$r_3 = 56.2770$
$\quad d_3 = 5.4129 \quad n_{02} = $ graded refractive index lens
$r_4 = -20.4627$
$\quad d_4 = 1.0133$
$r_5 = \infty$ (stop)
$\quad d_5 = 13.655-4.113$
$r_6 = -31.5075$
$\quad d_6 = 2.8218 \quad n_{03} = $ graded refractive index lens
$r_7 = -19.5082$
$\quad d_7 = 6.2189$
$r_8 = -12.6458$
$\quad d_8 = 2.6238 \quad n_{04} = 1.77250 \quad \nu = 49.66$
$r_9 = -65.8999$ $n_{01}(d) = 1.71736 + 0.91550 \times 10^{-3} \cdot r^2 + 0.24292 \times 10^{-4} \cdot r^4$
$n_{01}(g) = 1.74915 + 0.93262 \times 10^{-3} \cdot r^2 + 0.24529 \times 10^{-4} \cdot r^4$
$n_{02}(d) = 1.60300 - 0.31789 \times 10^{-3} \cdot r^2 - 0.14328 \times 10^{-5} \cdot r^4$
$n_{02}(g) = 1.61437 - 0.29503 \times 10^{-3} \cdot r^2 - 0.99455 \times 10^{-6} \cdot r^4$
$n_{03}(d) = 1.85026 + 0.13102 \times 10^{-2} \cdot r^2 + 0.24247 \times 10^{-5} \cdot r^4$
$n_{03}(g) = 1.88450 + 0.13616 \times 10^{-2} \cdot r^2 + 0.30063 \times 10^{-5} \cdot r^4$
$f_n/f_W = -2.543, \ (f_W)^2 \times n_1(2) = -0.419$
$(f_W)^2 \times n_1(3) = 1.726$

EMBODIMENT 2

$f = 41.2-78.5 \quad F/4.5-F/5.6$ $r_1 = 99.7737$
$\quad d_1 = 2.6022 \quad n_{01} = $ graded refractive index lens
$r_2 = 44.1605$
$\quad d_2 = 12.1839$
$r_3 = 50.5409$
$\quad d_3 = 5.8408 \quad n_{02} = $ graded refractive index lens
$r_4 = -23.4578$
$\quad d_4 = 1.0057$
$r_5 = \infty$ (stop)
$\quad d_5 = 13.659-3.547$
$r_6 = -38.1819$
$\quad d_6 = 4.2526 \quad n_{03} = $ graded refractive index lens
$r_7 = -21.5636$
$\quad d_7 = 5.8939$
$r_8 = -14.2122$
$\quad d_8 = 4.0087 \quad n_{04} = 1.83400 \quad \nu = 37.16$
$r_9 = -76.6179$ $n_{01}(d) = 1.80610 - 0.80380 \times 10^{-3} \cdot r^2 + 0.87536 \times 10^{-5} \cdot r^4$
$n_{01}(g) = 1.83115 - 0.78669 \times 10^{-3} \cdot r^2 + 0.88601 \times 10^{-5} \cdot r^4$
$n_{02}(d) = 1.54771 - 0.33509 \times 10^{-3} \cdot r^2 - 0.11848 \times 10^{-5} \cdot r^4$
$n_{02}(g) = 1.55843 - 0.32248 \times 10^{-3} \cdot r^2 - 0.96586 \times 10^{-6} \cdot r^4$
$n_{03}(d) = 1.85026 + 0.82798 \times 10^{-3} \cdot r^2 + 0.33922 \times 10^{-6} \cdot r^4$
$n_{03}(g) = 1.88450 + 0.83868 \times 10^{-3} \cdot r^2 + 0.65217 \times 10^{-6} \cdot r^4$
$f_n/f_W = -4.220, \ (f_W)^2 \times n_1(2) = -0.569$
$(f_W)^2 \times n_1(3) = 1.405$

EMBODIMENT 3

$f = 41.3-78.5 \quad F/4.5-F/5.6$ $r_1 = 108.2564$
$\quad d_1 = 2.5953 \quad n_{01} = $ graded refractive index lens
$r_2 = 46.6528$
$\quad d_2 = 12.1118$
$r_3 = 44.6857$
$\quad d_3 = 5.6096 \quad n_{02} = $ graded refractive index lens
$r_4 = -23.1349$
$\quad d_4 = 1.6366$
$r_5 = \infty$ (stop)
$\quad d_5 = 13.316-3.149$
$r_6 = -33.6022$
$\quad d_6 = 4.5435 \quad n_{03} = $ graded refractive index lens
$r_7 = -19.4739$
$\quad d_7 = 5.7735$
$r_8 = -13.1676$
$\quad d_8 = 2.8055 \quad n_{04} = $ graded refractive index lens -continued

| f = 41.3–78.5 F/4.5–F/5.6 |
| --- |

$r_9 = -71.0071$
$n_{01}(d) = 1.62374 - 0.67475 \times 10^{-3} \cdot r^2 + 0.78121 \times 10^{-5} \cdot r^4$
$n_{01}(g) = 1.64049 - 0.66136 \times 10^{-3} \cdot r^2 + 0.79671 \times 10^{-5} \cdot r^4$
$n_{02}(d) = 1.49700 - 0.34604 \times 10^{-3} \cdot r^2 - 0.15868 \times 10^{-5} \cdot r^4$
$n_{02}(g) = 1.50450 - 0.33426 \times 10^{-3} \cdot r^2 - 0.14092 \times 10^{-5} \cdot r^4$
$n_{03}(d) = 1.85026 + 0.77913 \times 10^{-3} \cdot r^2 + 0.13974 \times 10^{-5} \cdot r^4$
$n_{03}(g) = 1.88450 + 0.78921 \times 10^{-3} \cdot r^2 + 0.17500 \times 10^{-5} \cdot r^4$
$n_{04}(d) = 1.80610 - 0.42678 \times 10^{-4} \cdot r^2 - 0.92198 \times 10^{-6} \cdot r^4$
$n_{04}(g) = 1.83115 - 0.40329 \times 10^{-4} \cdot r^2 - 0.94702 \times 10^{-6} \cdot r^4$
$f_n/f_W = -6.102, (f_W)^2 \times n_1 (2) = -0.590$
$(f_W)^2 \times n_1 (3) = 1.329$

EMBODIMENT 4

| f = 36.2–67.6 F/4.5–F/5.6 | | |
| --- | --- | --- |
| $r_1 = 61.5613$ | | |
| | $d_1 = 1.1342$ | $n_{01}$ = graded refractive index lens |
| $r_2 = 37.6416$ | | |
| | $d_2 = 10.7709$ | |
| $r_3 = 58.5584$ | | |
| | $d_3 = 5.1696$ | $n_{02}$ = graded refractive index lens |
| $r_4 = -21.6403$ | | |
| | $d_4 = 0.9675$ | |
| $r_5 = \infty$ (stop) | | |
| | $d_5 = 13.695$–$3.841$ | |
| $r_6 = -33.6193$ | | |
| | $d_6 = 2.9340$ | $n_{03}$ = graded refractive index lens |
| $r_7 = -19.6118$ | | |
| | $d_7 = 5.9777$ | |
| $r_8 = -12.6269$ | | |
| | $d_8 = 2.3749$ | $n_{04}$ = graded refractive index lens |
| $r_9 = -62.8678$ | | |

$n_{01}(d) = 1.68893 + 0.87251 \times 10^{-3} \cdot r^2 + 0.23573 \times 10^{-4} \cdot r^4$
$n_{01}(g) = 1.71781 + 0.91000 \times 10^{-3} \cdot r^2 + 0.24593 \times 10^{-4} \cdot r^4$
$n_{02}(d) = 1.61800 - 0.31862 \times 10^{-3} \cdot r^2 - 0.18883 \times 10^{-5} \cdot r^4$
$n_{02}(g) = 1.63009 - 0.28957 \times 10^{-3} \cdot r^2 - 0.17110 \times 10^{-5} \cdot r^4$
$n_{03}(d) = 1.83400 + 0.14520 \times 10^{-2} \cdot r^2 + 0.32551 \times 10^{-5} \cdot r^4$
$n_{03}(g) = 1.86227 + 0.14940 \times 10^{-2} \cdot r^2 + 0.35592 \times 10^{-5} \cdot r^4$
$n_{04}(d) = 1.75500 + 0.34173 \times 10^{-4} \cdot r^2 + 0.34555 \times 10^{-7} \cdot r^4$
$n_{04}(g) = 1.77296 + 0.58013 \times 10^{-4} \cdot r^2 + 0.58000 \times 10^{-7} \cdot r^4$
$f_n/f_W = -3.082, (f_W)^2 \times n_1 (2) = -0.418$
$(f_W)^2 \times n_1 (3) = 1.903$

EMBODIMENT 5

| f = 36.2–67.6 F/4.5–F/5.9 | | |
| --- | --- | --- |
| $r_1 = 87.2463$ | | |
| | $d_1 = 2.3376$ | $n_{01}$ = graded refractive index lens |
| $r_2 = 39.2899$ | | |
| | $d_2 = 10.9064$ | |
| $r_3 = 38.5919$ | | |
| | $d_3 = 5.0487$ | $n_{02}$ = graded refractive index lens |
| $r_4 = -21.2727$ | | |
| | $d_4 = 1.6247$ | |
| $r_5 = \infty$ (stop) | | |
| | $d_5 = 11.863$–$2.016$ | |
| $r_6 = -33.1861$ | | |
| | $d_6 = 4.0409$ | $n_{03}$ = graded refractive index lens |
| $r_7 = -18.2380$ | | |
| | $d_7 = 5.1625$ | |
| $r_8 = -11.8874$ | | |
| | $d_8 = 2.0367$ | $n_{04}$ = graded refractive index lens |
| $r_9 = -58.7128$ | | |

$n_{01}(d) = 1.62374 - 0.70795 \times 10^{-3} \cdot r^2 + 0.11777 \times 10^{-4} \cdot r^4$
$n_{01}(g) = 1.64049 - 0.69193 \times 10^{-3} \cdot r^2 + 0.11928 \times 10^{-4} \cdot r^4$
$n_{02}(d) = 1.49700 - 0.45458 \times 10^{-3} \cdot r^2 - 0.24346 \times 10^{-5} \cdot r^4$ -continued

| f = 36.2–67.6 F/4.5–F/5.9 |
| --- |

$n_{02}(g) = 1.50450 - 0.43840 \times 10^{-3} \cdot r^2 - 0.21500 \times 10^{-5} \cdot r^4$
$n_{03}(d) = 1.85026 + 0.83118 \times 10^{-3} \cdot r^2 + 0.54807 \times 10^{-6} \cdot r^4$
$n_{03}(g) = 1.88450 + 0.84401 \times 10^{-3} \cdot r^2 + 0.88211 \times 10^{-6} \cdot r^4$
$n_{04}(d) = 1.80610 + 0.16152 \times 10^{-3} \cdot r^2 - 0.23857 \times 10^{-5} \cdot r^4$
$n_{04}(g) = 1.83115 + 0.16550 \times 10^{-3} \cdot r^2 - 0.24684 \times 10^{-5} \cdot r^4$
$f_n/f_W = -5.273, (f_W)^2 \times n_1 (2) = -0.596$
$(f_W)^2 \times n_1 (3) = 1.089$ where reference symbol $r_1$, $r_2$, ... $r_9$ respectively represent radii of curvature of respective lens surfaces, reference symbol $d_1$, $d_2$, ... $d_8$ respectively represent thicknesses of respective lenses and airspaces between respective lenses, reference symbol $n_{01}$, $n_{02}$, $n_{03}$ and $n_{04}$ respectively represent refractive indices of respective lenses and reference symbol $\nu$ represents Abbe's number of respective lenses.

In Embodiments 1 and 2 of the zoom lens system according to the present invention, the refractive index lenses are employed as the first, second and third lens components to thereby correct, especially, positive distortion generated at the wide-angle position and spherical aberration generated at the telephoto position.

In Embodiments 3 through 5 of the zoom lens system according to the present invention, the graded refractive index lens is also employed as the fourth lens component to thereby correct various aberrations.

Figure 3:
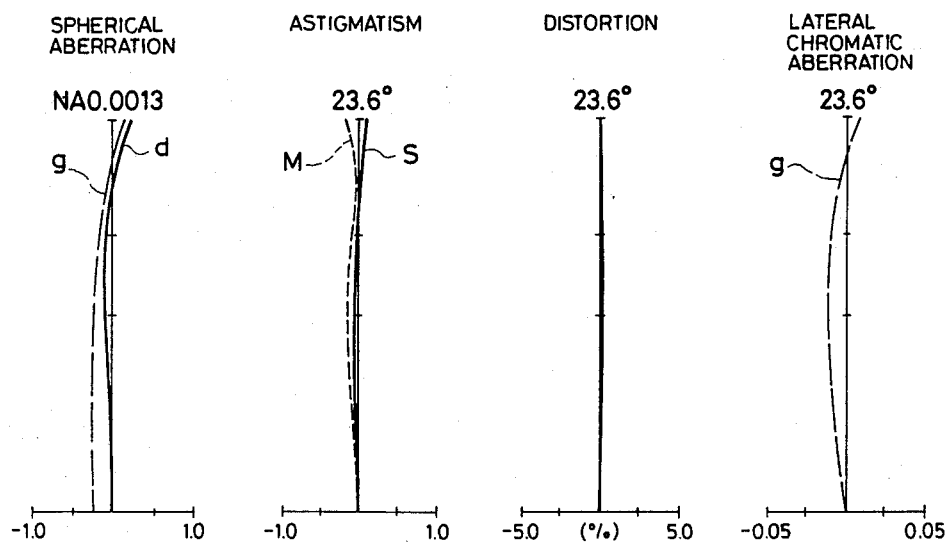
Figure 4:
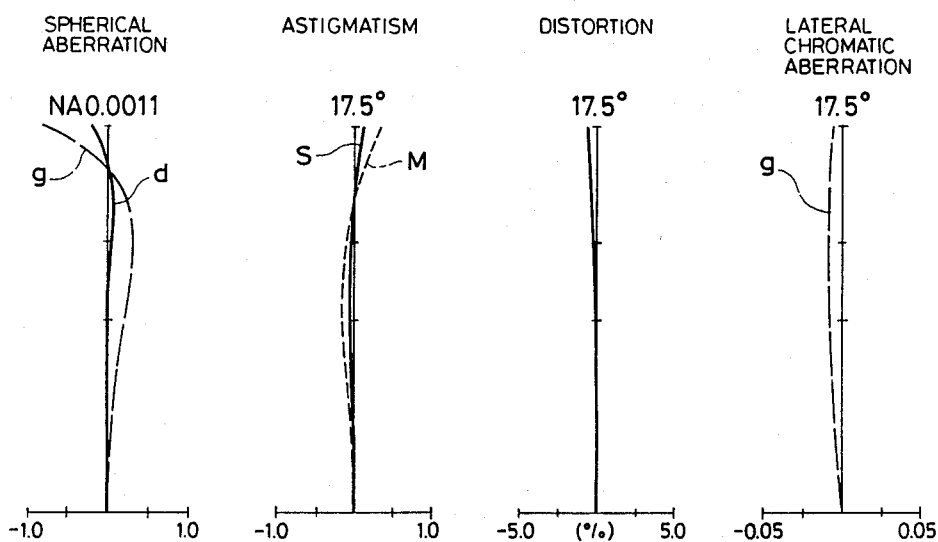
Figure 5:
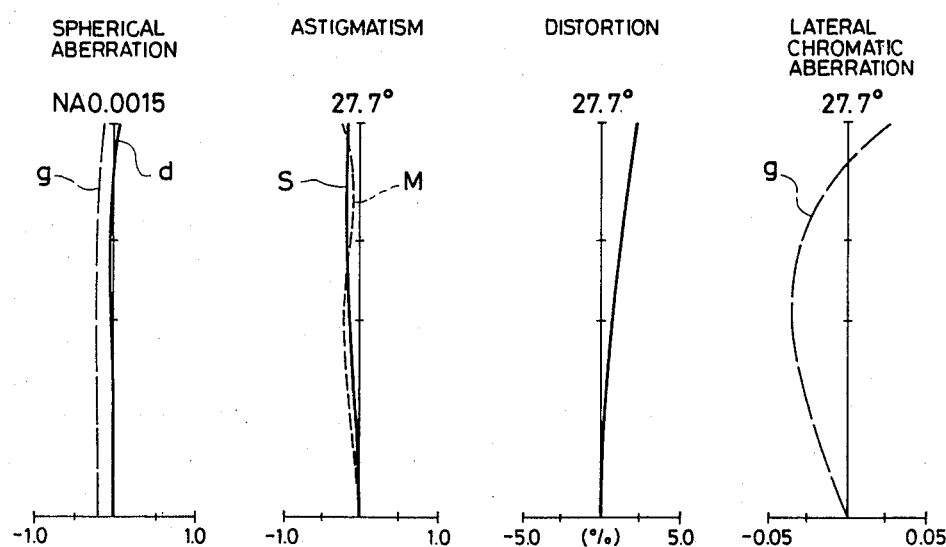
Figure 8:
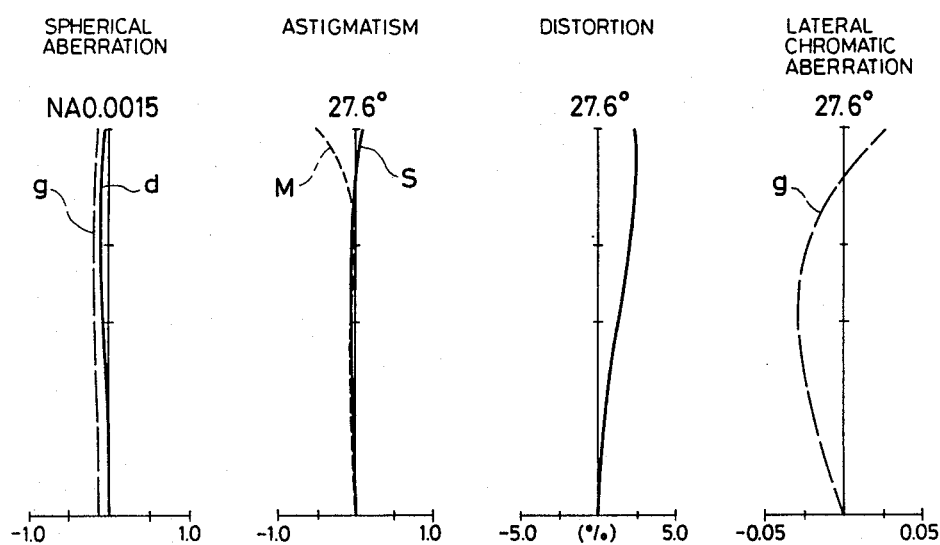
FIGS. 8 through 10 show graphs illustrating aberration curves of Embodiment 3 of the zoom lens system according to the present invention.
Figure 9:
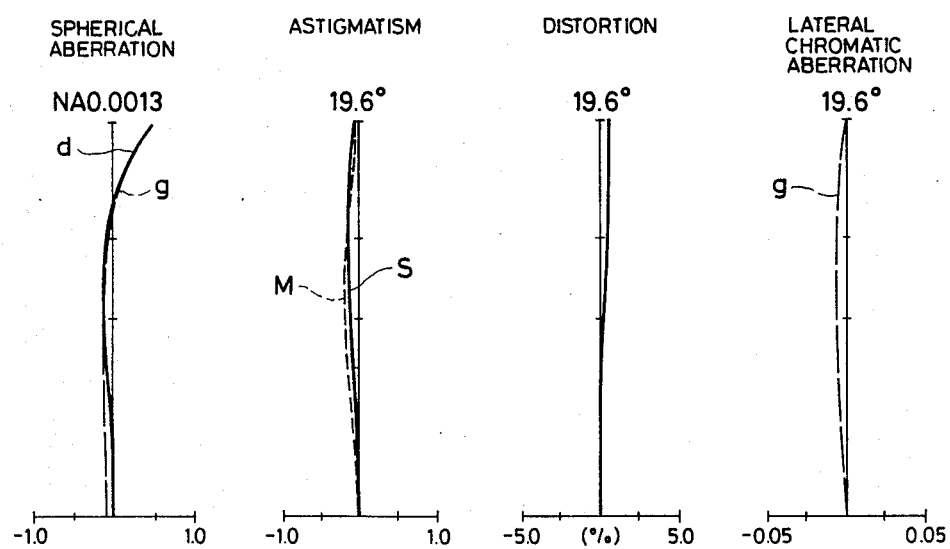
Figure 10:
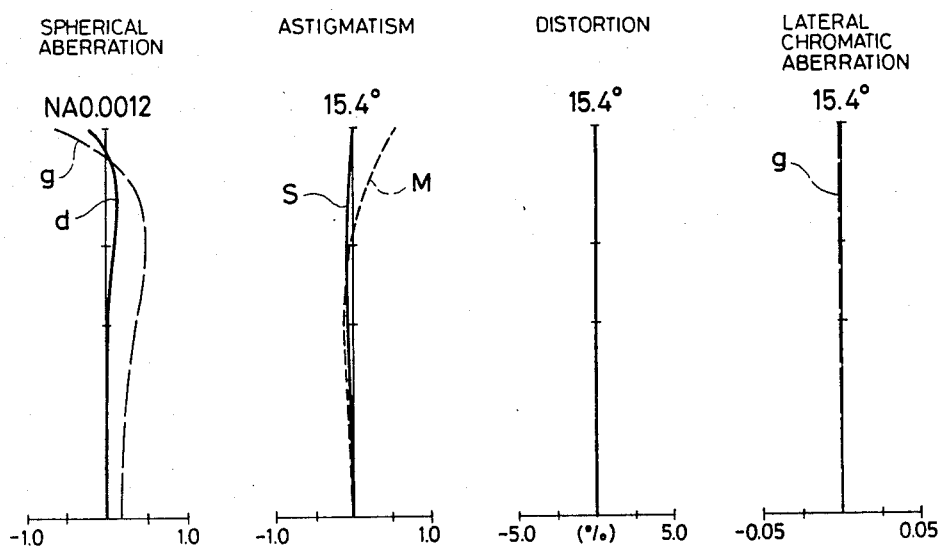
Figure 11:
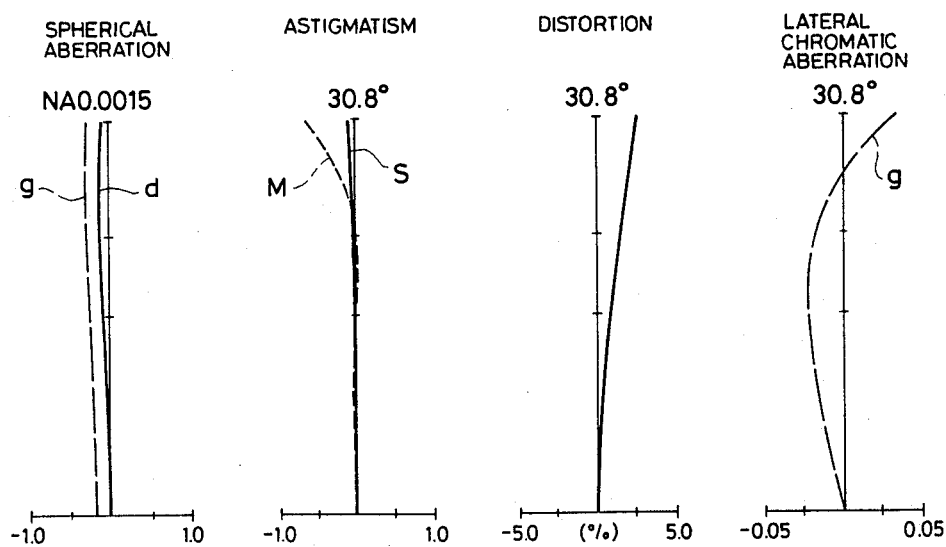
FIGS. 11 through 13 show graphs illustrating aberration curves of Embodiment 4 of the zoom lens system according to the present invention.
Figure 12:
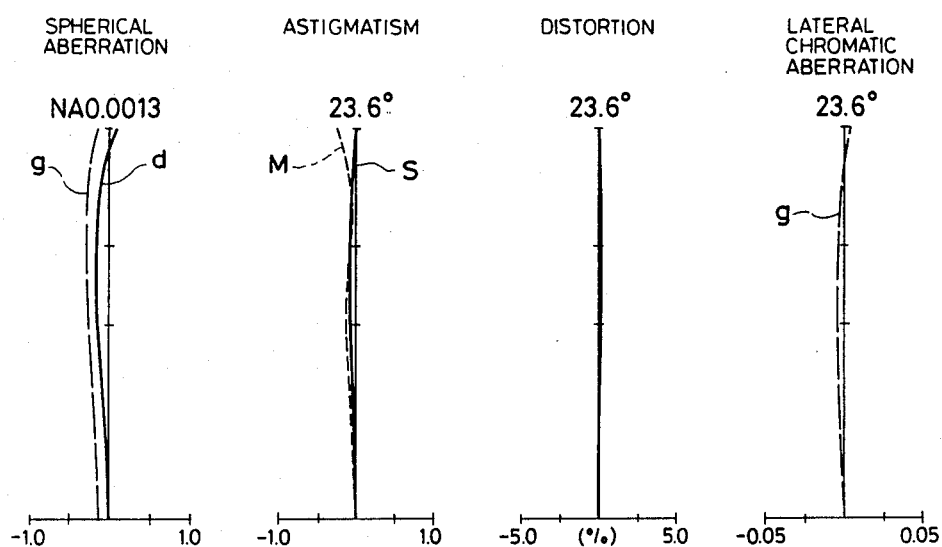
Figure 13:
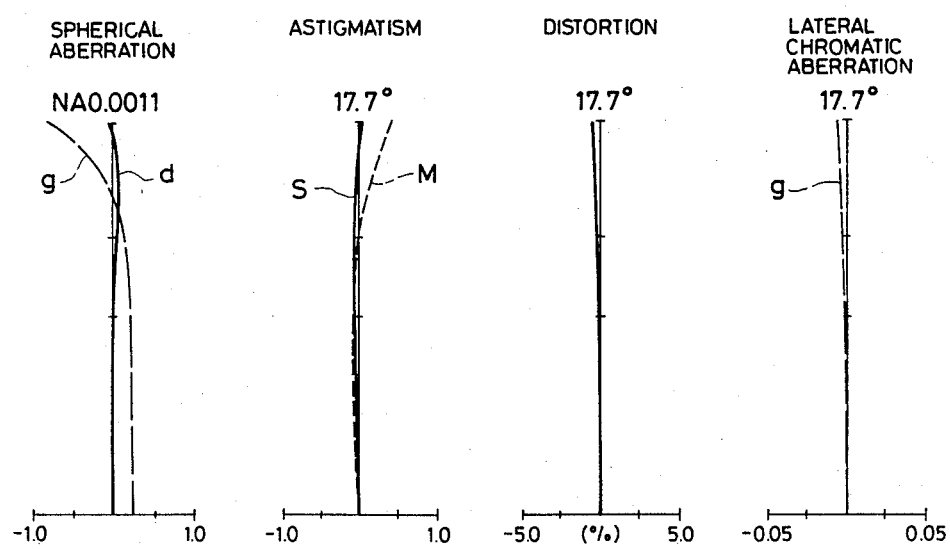
Figure 14:
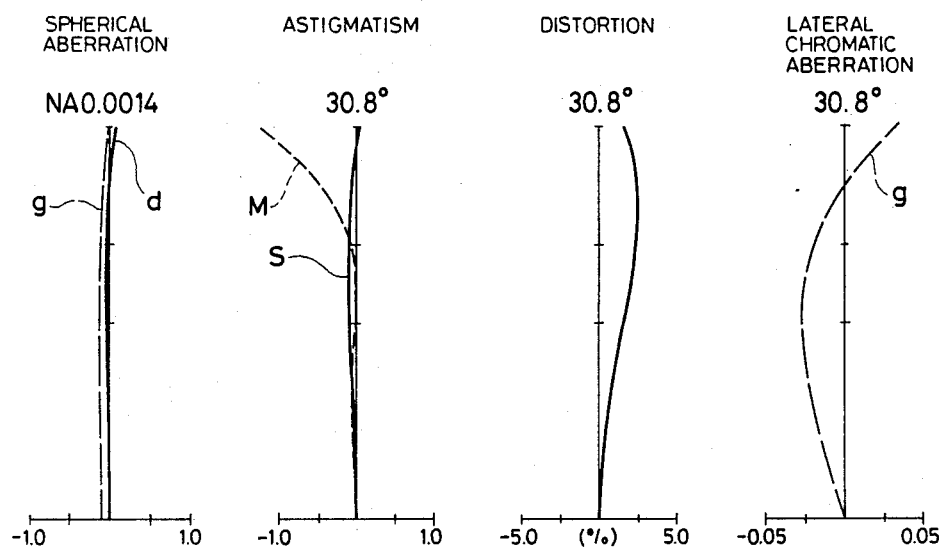
FIGS. 14 through 16 show graphs illustrating aberration curves of Embodiment 5 of the zoom lens system according to the present invention.
Figure 15:
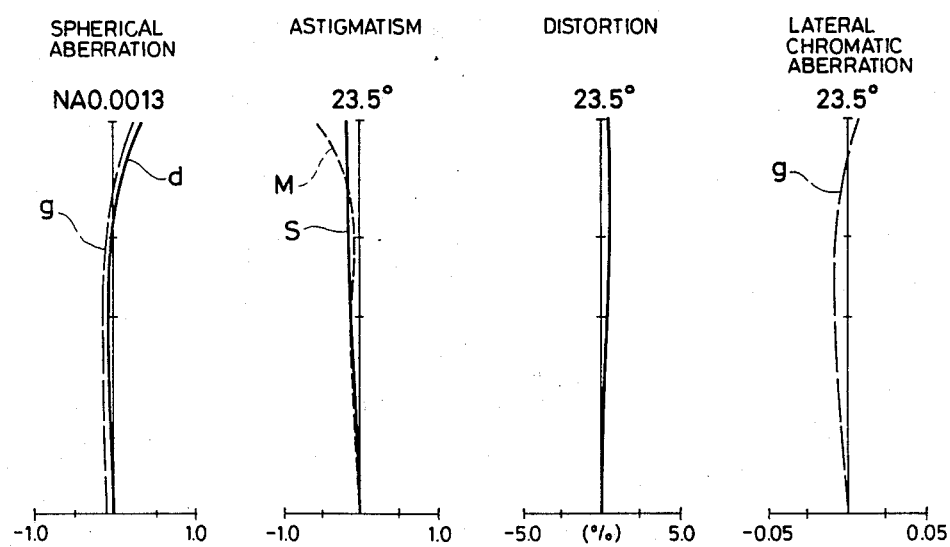
Figure 16:
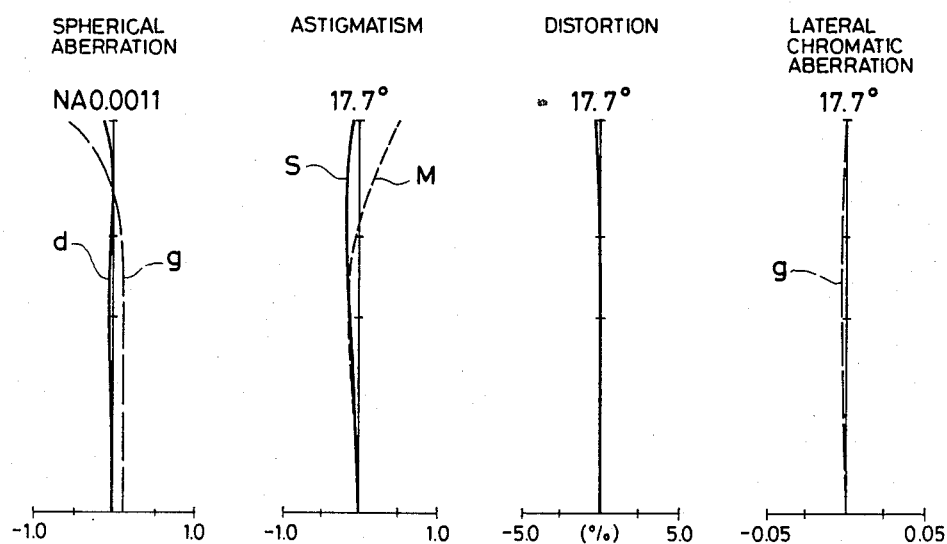

The aberration curves of Embodiment 1 of the zoom lens system according to the present invention in the wide-angle position, the middle position and the telephoto position are respectively shown in FIGS. 2 through 4. The aberration curves of Embodiment 2 of the zoom lens system according to the present invention in the wide-angle position, the middle position and the telephoto position are respectively shown in FIGS. 5 through 7. The aberration curves of Embodiment 3 of the zoom lens system according to the present invention in the wide-angle position, the middle position and the telephoto position are respectively shown in FIGS. 8 through 10. The aberration curves of Embodiment 4 of the zoom lens system according to the present invention in the wide-angle position, the middle position and the telephoto position are respectively shown in FIGS. 11 through 13. The aberration curves of Embodiment 5 of the zoom lens system according to the present invention in the wide-angle position, the middle position and the telephoto position are respectively shown in FIGS. 14 through 16. Respectively aberration curves are illustrated for the object of the magnification of 1/75.

The zoom lens system according to the present invention is a compact lens system with a large aperture ratio and a zooming ratio of about 2 in which, despite that the number of lens components is 4, various aberrations are corrected excellently and the fluctuation of aberrations during a zooming operation is small.

I claim:

1. A compact zoom lens system comprising, in order from the object side, a front lens group having a positive refracting power and a rear lens group having a negative refracting power, said front lens group consisting of a first lens component of a negative lens and a second lens component of a positive lens, said rear lens group consisting of a third lens component of a positive lens and a fourth lens component of a negative lens, said first lens component being disposed nearest to the object, said compact zoom lens system being arranged to be zoomed by varying the space between said front lens group and said rear lens group.

2. A compact zoom lens system according to claim 1, in which said first lens component comprises a radial graded refractive index lens having the refractive index distribution expressed by the following formula:

$$n(r) = n_0 + n_1 r^2 + n_2 r^4 + \ldots$$

where $n(r)$ represents the refractive index at the radial distance r from the center of said lens, $n_0$ represents the refractive index at the center of said lens, r represents the radial distance from the center of said lens, $n_1, n_2, \ldots$ respectively represent the 2nd, 4th-, ... order coefficients.

3. A compact zoom lens system according to claim 2, in which said second lens component comprises a radial graded refractive index lens having the refractive index distribution expressed by the following formula:

$$n(r) = n_0 + n_1 r^2 + n_2 r^4 + \ldots$$

where $n(r)$ represents the refractive index at the radial distance r from the center of said lens, $n_0$ represents the refractive index at the center of said lens, r represents the radial distance from the center of said lens, $n_1, n_2, \ldots$ respectively represent the 2nd-, 4th-, ... order coefficients.

4. A compact zoom lens system according to claim 3, further satisfying the following condition:

$$f_n/f_w < -1.5 \tag{1}$$

$$n_0(2) < 1.7 \tag{2}$$

where $f_n$ represents the focal length of said first lens component, $f_w$ represents the equivalent focal length of the whole system in the wide-angle position, $n_0(2)$ represents the refractive index at the center of said second lens component.

5. A compact zoom lens system according to claim 4, further satisfying the following condition:

$$-12.25 < (f_w)^2 \times n_1(2) < 0 \tag{3}$$

where $n_1(2)$ represents the coefficient $n_1$ on the expression of the refractive index distribution of said second lens component.

6. A compact zoom lens system according to claim 5, in which said third lens component comprises a radial graded refractive index lens having the refractive index distribution expressed by the following formula:

$$n(r) = n_0 + n_1 r^2 + n_2 r^4 + \ldots$$

where $n(r)$ represents the refractive index at the radial distance r from the center of said lens, $n_0$ represents the refractive index at the center of said lens, r represents the radial distance from the center of said lens, $n_1, n_2, \ldots$ respectively represent the 2nd-, 4th, ... order coefficients.

7. A compact zoom lens system according to claim 6, further satisfying the following condition:

$$0 < (f_w)^2 \times n_1(3) < 12.25 \tag{4}$$

where $n_1(3)$ represents the coefficient $n_1$ on the expression of the refractive index distribution of said third lens component.

8. A compact zoom lens system according to claim 7, in which said first lens component comprises a negative meniscus lens having its convex surface directed toward the object, said second lens component comprises a biconvex lens, said third lens component comprises a positive meniscus lens having its concave surface direct toward the object and said fourth lens component comprises a negative meniscus lens having its concave surface direct toward the object.

* * * * *